United States Patent [19]

Airaksinen

[11] 4,175,904
[45] Nov. 27, 1979

[54] APPARATUS FOR MOUNTING, DEMOUNTING, AND TIPPING VEHICLES

[75] Inventor: Markku Airaksinen, Iisalmi, Finland

[73] Assignee: Multilift Oy, Raisio, Finland

[21] Appl. No.: 894,687

[22] Filed: Apr. 10, 1978

Related U.S. Application Data

[63] Continuation of Ser. No. 713,893, Aug. 12, 1976, abandoned.

[30] Foreign Application Priority Data

Aug. 22, 1975 [FI] Finland .................. 752382
Apr. 15, 1976 [DE] Fed. Rep. of Germany ....... 2616813

[51] Int. Cl.² .................................. B60P 1/64
[52] U.S. Cl. .................................. 414/421; 414/469; 414/498
[58] Field of Search ........... 214/505, 515, 77 R, 214/78, 80; 298/11, 12

[56] References Cited

U.S. PATENT DOCUMENTS

| 3,819,075 | 6/1974 | Dekain | 214/515 |
| 3,874,537 | 4/1975 | Kou | 214/501 |
| 3,892,323 | 7/1975 | Corompt | 214/515 |
| 3,964,625 | 6/1976 | Wirtz | 214/515 |
| 3,984,013 | 10/1976 | Wirtz | 214/515 |

FOREIGN PATENT DOCUMENTS 2508436 11/1975 Fed. Rep. of Germany.
2148964 3/1973 France.

Primary Examiner—Albert J. Makay
Attorney, Agent, or Firm—Bierman & Bierman

[57] ABSTRACT

Apparatus for mounting, demounting and tipping a container designed to be carried on a motor vehicle in which a four bar linkage is mounted both to the vehicle and to the container. For mounting and demounting, the four bar linkage is made linearly translatable along the bed of the vehicle. Hydraulic piston and cylinder arrangements are provided to pivot select links of the four bar linkage to a position in which the container is placed on the ground. For tipping, select links of the four bar linkage are rendered immobile with respect to each other and a piston and cylinder assembly activated to tip the container on the vehicle bed.

6 Claims, 11 Drawing Figures

FIG. 8.
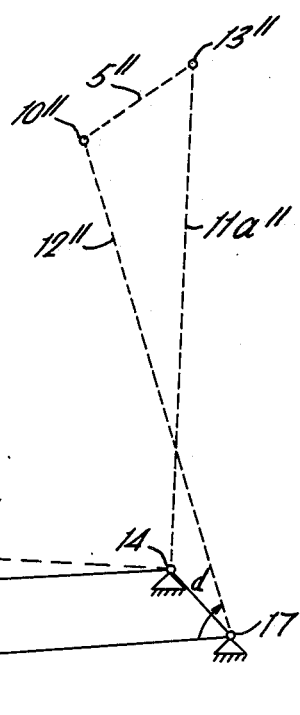
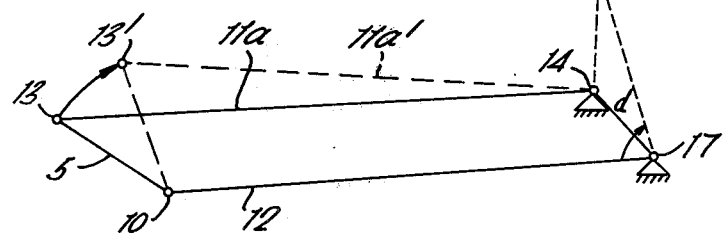
FIG. 9.
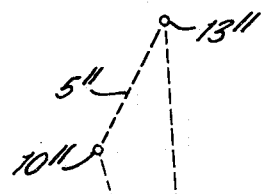
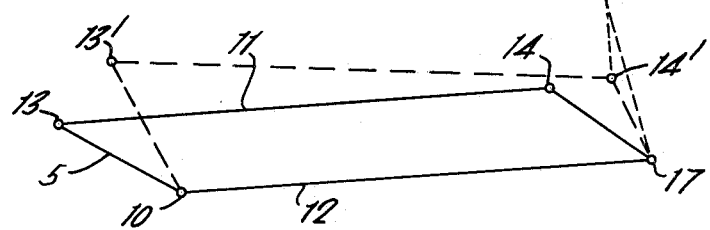

APPARATUS FOR MOUNTING, DEMOUNTING, AND TIPPING VEHICLES

This application is a continuation of copending application Ser. No. 713,893, filed Aug. 12, 1976, now abandoned, which claimed the priority of German No. P 26 16 813.8 filed Apr. 15, 1976 and Finnish No. 752382 filed Aug. 22, 1975.

This invention relates to apparatus for mounting and demounting a container from a raised surface. This invention further relates to apparatus for tipping a container on a raised surface. The apparatus is most useful with motor vehicles, especially of the flat bed variety.

The ensuing description relates the invention to a flat bed vehicle. It is to be understood that the apparatus comprising the invention can be used with any raised surface, moveable or stationary, and is not limited for use with a flat bed vehicle.

Today's freight industry utilizes containers for the shipment and transhipment of goods. The containers are preloaded and then placed on a flat bed truck for movement to other points, frequently a rail line or harbor, where the container is transferred from the motor vehicle to the train or ship. Containers have also found application in the refuse collection industry. The refuse container is carried to its destination on a flat bed truck then demounted and left behind to be removed when full. In either instance, means must be provided for mounting and demounting the container from the vehicle. In some instances, tipping the container to release its contents is also desirable and finds use in refuse dumping and concrete pouring, among others.

German Publication DAS No. 21 44 562 discloses one type of mechanism employing a lift arm for lifting the container. A pair of piston/cylinder assemblies operate on a bracket having a free end for attachment to the container. The bracket in the mechanism disclosed in this German disclosure can be moved by one of the piston/cylinder units and pivoted or swung by the other. The arrangement, however, provides a very long and high arc for the end of the bracket connected to the container, raising it high off the vehicle bed and depositing the container on the ground a goodly distance from the rear of the vehicle. Disadvantages include vehicle tipping as the center of gravity of the combined vehicle-container combination shifts rearwardly and upwardly and the torque about the rear wheels becomes unbalanced. Another disadvantage is the need for inordinately long piston/cylinder assemblies resulting in high production cost and difficulty in making and installing the piston/cylinder units.

One of the objects of the invention is to use short length and stroke piston/cylinder assemblies and control the path of travel of the container during mounting and demounting to avoid vehicle tipping. A further object is to permit the vehicle to be positioned close to the container when ready to mount and to demount the container to a position quite close to the vehicle.

In accordance with the present invention, a lift arm is provided which can be connected to the container, further means being provided for translating and swivelling the lift arm in a selected, controlled path requiring the use of relatively short piston/cylinder assemblies. By so controlling mechanism motion, the tipping problem inherent in high arc swivelling motion of the prior art is avoided and in addition, the vehicle may be moved quite close to the container when mounting it and can demount the container close to the vehicle body as well.

For best results, the lifting assembly may comprise an angular lever functioning as a lift arm having a hook mountable to hook receiving means located at the forward end of the container. Piston/cylinder means are also included for moving the lever in a select, low arc in response to piston movement. Preferably, the hook means is made to translate and to follow several interconnected paths and for best results, the demounting motion is first sharply vertical followed by a rapid change to a long horizontal movement rising only slightly, ending in a rather sharp, circular motion carrying the hook towards ground at which point container demounting is complete. The same preferred motion, executed in reverse, is employed to mount the container onto the truck.

The foregoing motion may best be obtained using a four bar linkage in which the four links or bars connect through pivots, the piston/cylinder units acting to rotate and translate the links in a selected manner thus moving the hook along the path selected for it. For best results, one or more of the pivot connections are made relocatable to change the relationship of the bars or links thus achieving the optional hook travel path.

Further and other advantages of the invention appear in the following detailed description of several embodiments of the invention, taken with the drawings in which like numerals refer to like parts, and wherein;

FIG. 8 is a detail of a four bar linkage having links and sections effective when hoisting and swinging the lift arm and FIG. 9 is another embodiment of a useful four bar linkage.

Figure 1:
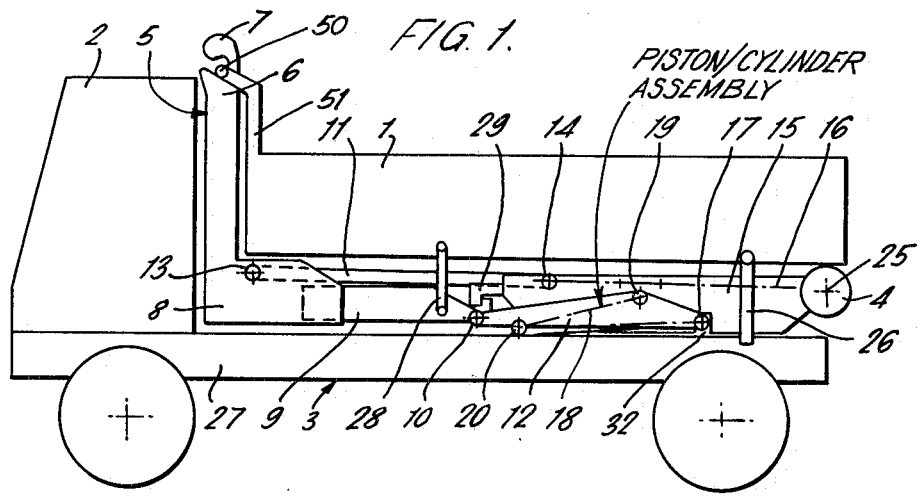
FIG. 1 is a side schematic view of apparatus according to the invention showing the lifting assembly and a container in transport position on the raised bed of a vehicle.

For mounting and demounting as well as tipping a container 1, a flat bed vehicle 2 is equipped with a bed or platform 3 having a pair of rollers 4 located at the rear part of the vehicle. The container is normally provided with a plurality of beams which ride on the rollers 4. A lift arm 5 in the form of an L-shaped lever, or bell crank, is mounted at the forward end of a linkage assembly more fully described herein below.

Lift arm 5 consists of arms 6 and 8 positioned substantially at right angles to each other. Arm 6 terminates in a hook 7 for engaging a transverse bar 50 projecting forward of container 1 on spaced arms 51. Hook 7 freely rotates on bar 50. Means may be used to pivotably connect hook 7 to the container other than the particular hook and bar assembly shown herein.

Arm 8 of the lift arm 5 is adjustable in length and includes a slidable member 9. Member 9 is moveable between its fully extended position, shown in FIG. 1, and a position in which the member is at least partially entrained in arm 8, as most clearly seen in FIG. 2. Member 9 is pivoted via bearing 10 to one end of a pair of laterally spaced brackets 12 about which the entire lift arm 5 can be swivelled.

Lift arm 5 is pivoted to a pair of supporting brackets 15 through a rod 11 as well as spaced brackets 12. More specifically, supporting link 11 preferably an elongated thrust rod, is pivoted via bearing 13 to one end of arm 8. The other end of the rod 11 is equipped with a bearing 14 through which the rod 11 is pivoted to main or bracing brackets 15.

Bearing 14 of rod 11 is connected to a piston/cylinder assembly 16 (FIG. 3) located between the pair of brackets 15. By means of the piston/cylinder assembly 16, the rod 11 may be made to move from the position in FIG. 1 to the position in FIG. 2. The rod 11 in this case acts as a drawbar on lift arm 5, translating the entire lift arm to the right as viewed in FIG. 1 when the piston is retracted and back when the piston is extended, member 9 serving to guide and control the translating movement of the lift arm. As can be readily appreciated, piston retraction will translate not only lift arm 5, but container 1 as well, to the position shown in FIG. 2. Extension of the piston will of course move the container 1 back into the transport position illustrated in FIG. 1. Brackets 12 are pivoted to the vehicle body or bracing brackets 15 by means of a bearing 17. A piston/cylinder assembly indicated at 18 is pivoted on brackets 12 via bearing 19 as close as possible to that end of the brackets connected to the vehicle at bearing 17. The other end of the piston/cylinder assembly 18 is swivel mounted to bearing 20.

Figure 2:
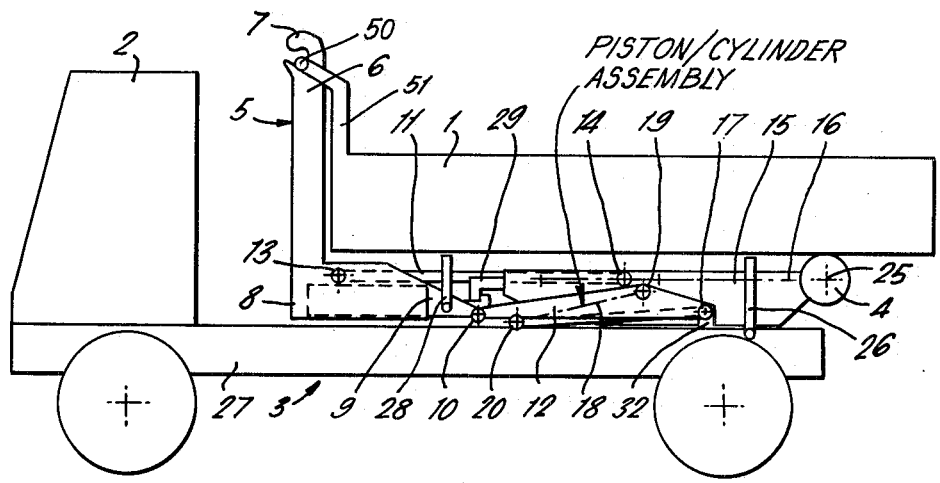
FIG. 2 is the same view as in FIG. 1 showing the container moved horizontally to the rear and the relative location of the various parts of the lifting assembly.
Figure 3:
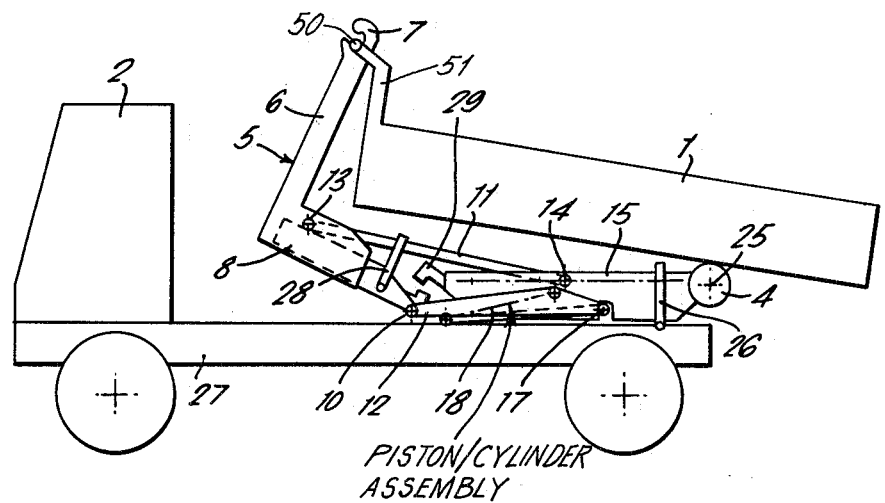
FIG. 3 is the same view as in FIGS. 1 and 2 showing the relationship between various parts of the lifting assembly after a selected amount of movement to the rear has occurred.

FIG. 2 depicts the initially translated position of the container 1 in preparation for container demounting from the vehicle. Further retracting the piston of piston/cylinder assembly 16 will swivel lift arm 5 about bearing 10 until the position in FIG. 3 is reached, bearing 14 having been pulled and translated by the piston close to the rear end of the vehicle. In this position, container 1 has begun to tilt and has moved farther on its rollers 4 in furtherance of the demounting operation.

Extension of the piston of piston/cylinder assembly 18, swivels brackets 12 about the bearing 17. Lift arm 5 conjointly pivots about bearing 10 due to the restraints placed on the lift arm by rod 11, thus constraining the hook 7 to follow the curve in FIG. 4 from the position 22 until the container 1 is demounted close to the rear quarters of the vehicle, substantially as shown. Curve 23 illustrates the movement of lift arm swivel motion more clearly detailed in FIG. 3.

The link assembly comprises the lift arm 5 and a four bar linkage comprised of rod 11, brackets 12 and bearings 10, 13, 14 and 17, arm 8 and brackets 15 acting as the connecting links between bearings 10, 13 and 14, 17, respectively. The rod 11 and brackets 12 are constant in length and the location of the bearing 17 is fixed. The remaining links and bearings are moveable with the various phases of the mounting/demounting operation between the position delineated in FIG. 1 to the positions delineated in FIG. 4.

In the initial position as shown in FIG. 1, the bearings 13 and 14 of the rod 11 are located above and, seen in the lengthwise direction of the vehicle, in front of the brackets 12. As seen from FIG. 4, both rod 11 and brackets 12 cross each other when the hook 7 on the lift arm 5 runs along the curved line 21, this occurring because the curved line 21 which the hook follows during its travel at the rearwardmost part of the vehicle is at first very steep, and then less so, thereby flattening the radius of the circular like path executed by the hook 7. To mount the container 1 to the vehicle, one need only repeat the foregoing steps in reverse order.

Figure 4:
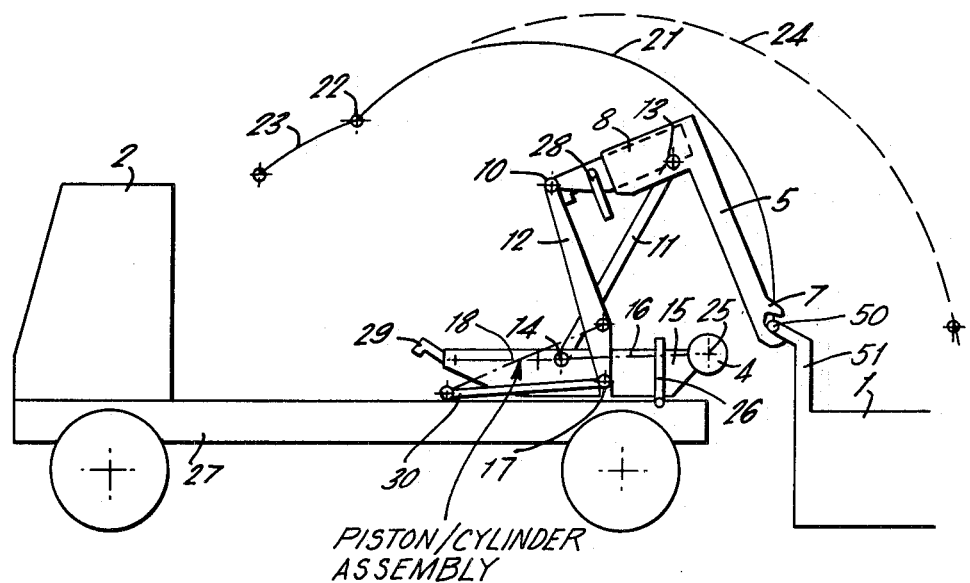
FIG. 4 is the same view as in FIGS. 1 to 3 illustrating actual demounting of the container and the relationship between the various parts of the lifting assembly, along with the path followed by the hook during the entire demounting operation.

For purposes of comparison, FIG. 4 shows in broken lines the curved path 24 which the hook 7 would have followed if the lift arm 5 were not controlled by the aforedescribed four bar linkage. The container would have moved higher and farther to the rear of the vehicle, thus increasing the danger of vehicle tipping and also requiring the use of other long and expensive piston/cylinder assemblies, both undesirable.

Figure 5:
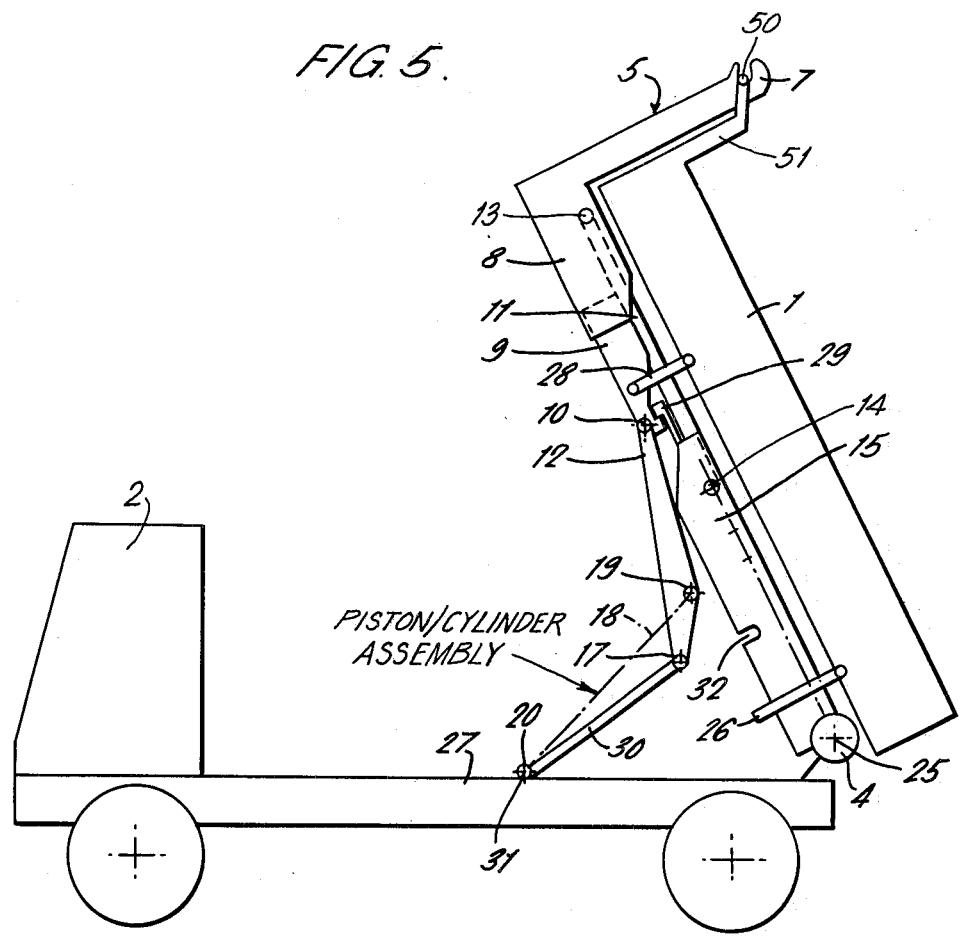
FIG. 5 is the same view as in FIG. 1 with the container shown in the tipped position.
Figure 6:
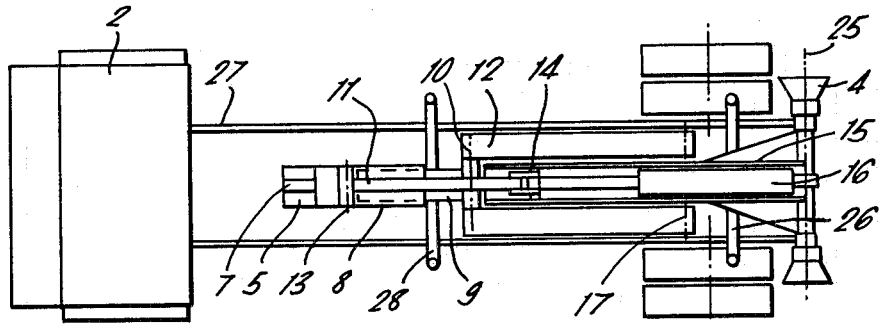
FIG. 6 is a top plan view of the vehicle with the container removed.

For tipping rather than demounting as shown in FIG. 5, the bracing brackets 15, swivel mounted to the vehicle by the piston/cylinder assembly 18 around its bearing axle 25 (also the axle for rollers 4), are locked to the container. The piston cylinder assembly 16, the rod 11, the guide piece 9 and the lift arm 5 maintain the transport position and are not swivelled.

Figure 1A:
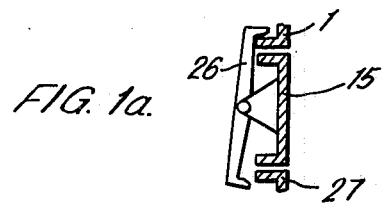
FIG. 1a is a detail view of a locking mechanism for retaining the lifting assembly and container together for transport.
Figure 2A:
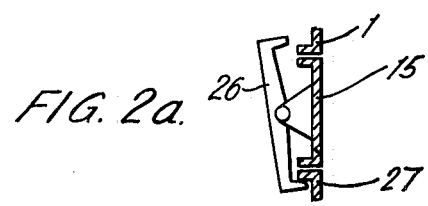
FIG. 2a is a detail view of the locking mechanism of FIG. 1a showing the locking mechanism anchoring the lifting assembly to the vehicle.

In order to swivel the bracing brackets 15, it is necessary to disengage a locking device 26 which fastens the bracing brackets 15 firmly to the vehicle body 27 when the container 1 is being demounted or mounted. If the container 1 is tipped, the lock 26 to the vehicle body 27 is detached to lock the container 1 firmly to the brackets 15. FIGS. 1a and 2a depict the locking mechanism and the change in position from container to vehicle body.

Still another locking device 28 is located between the container 1 and lift arm 5 or member 9. This lock 28 is disengaged only when mounting or demounting the container 1 and is thus engaged during transport.

A third lock 29, having a hook in the front end of the brackets 15 and a complementary hook on member 9 of lift arm 5, fastens the brackets 15 to the lift arm 5 and increases their relative rigidity during tipping. As indicated in FIGS. 2 through 4, the lock 29 is disengaged when mounting and demounting the container 1.

Finally, FIG. 5 shows that during the tipping of the container 1 the brackets 12 are detached from their anchor in the bracing brackets 15 and held by means of a support 30. One end of the support 30 is pivoted via bearing 17 on brackets 12 and the other end pivoted via bearing 31 to the vehicle body. Thus the axis of the bearing 31 coincides with the axis of the bearing 20 of the piston/cylinder assembly 18.

Bearing 17 is anchored to the vehicle body to fix its position to maintain the four bar linkage discussed above for mounting and dismounting the container by means of bracing brackets 15 and more particularly by a notch 32 located in the bracing brackets. Notch 32 opens towards the vehicle body 27 and encircles the bearing 17 on the parts located in front of it transversely in the lengthwise direction of the vehicle. Disengagement of bearing 17 is automatic when bracing brackets 15 swivel around their axis 25 to tip the container 1 as shown in FIG. 5.

In the transport position, the brackets 12 and the support 30 are located nearly parallel to each other or on each other, bearing 17 being situated between the vehicle end and the bearing 31, thus providing a very compact structure.

Figure 7:
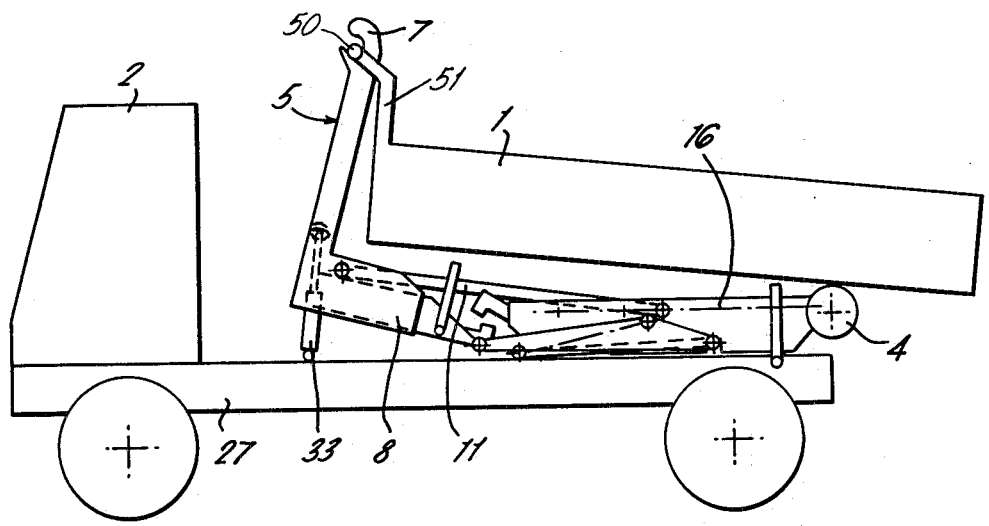
FIG. 7 is another embodiment of a lifting assembly useful in the present invention.

The dimensions of the piston/cylinder assembly 16 can be decreased to a minimum, when, as shown in FIG. 7, an auxiliary piston cylinder assembly 33 is used to contact lift arm 5 during the first phase of its swivel movement. The piston/cylinder assembly 33 can be single acting and used to assist piston/cylinder assembly 16 under maximum load.

Though the rod 11 in the above description is shown movable in its entirety by means of the piston/cylinder assembly 16, it is of course possible to use a piston/cylinder assembly which with the bearing 14 in the position shown in FIG. 3, directly contacts the bearing 13 on the lift arm 5 in the position of FIG. 1. In this case an essentially bigger or longer piston cylinder assembly is required, but, on the other hand, the use of a member for the bearing 14, located in the brackets 15, can be omitted.

Finally, FIGS. 8 and 9 schematically present the four bar linkage and its modification. The reference numbers of the links and linking points characterize the corresponding parts of the equipment shown in FIGS. 1 to 7. In these FIGS. 11a does not represent a supporting rod of constant length but rather represents a piston/cylinder assembly having an adjustable length.

Should the piston/cylinder assembly 11a be shortened to 11a' as shown in FIG. 8 or the bearing 14 pulled to the position 14' in accordance with FIG. 9, the bearing 13 changes its location and moves to the point 13'. Should now the piston/cylinder assembly 18 be operated to hoist supporting link 12, the bearings 10 and 13 will move to the points 10" and 13", and the connecting link 5 between these two bearings will move to a new location 5".

FIGS. 8 and 9 illustrate two methods of using the basic four bar linkage to obtain the movements provided by the present invention. Many variations are possible by the optimum selection of section lengths and of the location of bearings. Many other modifications to the apparatus may be made by those of ordinary skill and it is intended to cover all modifications which fall within the spirit and scope of the invention as defined in the claims appended hereto.

What we claim is:

1. Apparatus for mounting, demounting or tilting a container relative to the flat bed of a vehicle through the use of an L-shaped lever having a normally vertical arm pivotally and detachably engageable at its upper end to the front end of said container, and a normally horizontal arm positioned beneath said container and parallel to and above said flat bed, wherein the improvement comprises a pair of transverse, longitudinally spaced-apart pivots, means detachably securing said pivots to said bed, a pair of transversely spaced brackets connected at one end to the rearward of said pivots and at the other end pivotally connected to the rearward end of said horizontal arm, a thrust rod connected at one end to the forward of said pivots and at its other end pivotally connected to the junction of the vertical and horizontal arms of said lever, whereby when said pivots are attached to said bed, that portion of the bed interconnecting the spaced pivots, said thrust arm, said brackets and the horizontal arm of said lever form a rigid four bar linkage defining the path of movement of the upper end of the vertical arm of said L-shaped lever and hence the movement of the front end of said container, and a piston-cylinder assembly for moving said four bar linkage to mount and demount said container, said piston-cylinder assembly being pivotally connected at one end to said bed at a point forward of said spaced pivots, and at its other end pivotally connected to said brackets at a point intermediate their ends.

2. Apparatus according to claim 1, in combination with a plurality of rollers attached to the rear end of the bed of said vehicle and supporting the rear end of said container.

3. Apparatus according to claim 1, in which said normally horizontal arm comprises one member rigidly connected to said vertical arm and a second member normally extending from and slidably engaging said first member, and in which said brackets are pivotally attached to said slidable member, and a second piston-cylinder assembly connected to said thrust rod for moving said one member into nesting relationship with said second member.

4. Apparatus according to claim 2, in combination with a second pair of laterally-spaced brackets pivotally attached at one end to the bed of said vehicle about the axis of said rollers, and in which said detachable means is mounted on said second pair of brackets for alternatively locking said second pair of brackets to the bed of said vehicle or to said container, and in which the spaced-apart pivot attached to one end of the thrust rod is supported by said second pair of brackets and the spaced-apart pivot of the first pair of brackets is held against said bed by said second pair of brackets when they are locked thereto.

5. Apparatus according to claim 4, in combination with second detachable means locking the other end of said second pair of brackets to said horizontal arm, during the normal and tilting positions of said container, and unlocking said second pair of brackets from said horizontal arm during the mounting and demounting positions of said container.

6. Apparatus according to claim 5, in combination with third detachable means for clamping said horizontal arm to the container during tilting movement of said container, whereby upon actuation of the first piston assembly said L-shaped lever and said second pair of spaced brackets move as a unit with said container during the tilting movement.

* * * * *